(12) United States Patent
Perkins et al.

(10) Patent No.: US 8,457,656 B2
(45) Date of Patent: Jun. 4, 2013

(54) WIRELESS TRACKING SYSTEM AND METHOD UTILIZING MULTIPLE LOCATION ALGORITHMS

(75) Inventors: Matthew R. Perkins, San Diego, CA (US); Wei Geng, San Diego, CA (US)

(73) Assignee: Awarepoint Corporation, San Diego, CA (US)

( * ) Notice: Subject to any disclaimer, the term of this patent is extended or adjusted under 35 U.S.C. 154(b) by 0 days.

(21) Appl. No.: 13/244,257

(22) Filed: Sep. 23, 2011

(65) Prior Publication Data

US 2012/0077514 A1     Mar. 29, 2012

Related U.S. Application Data

(60) Provisional application No. 61/386,601, filed on Sep. 27, 2010.

(51) Int. Cl.
*H04W 24/00* (2009.01)
*G08B 21/00* (2006.01)

(52) U.S. Cl.
USPC .................................. 455/456.1; 340/686.6

(58) Field of Classification Search
USPC ..... 455/456.1, 434, 140, 414.2, 7; 340/686.6, 340/539.26, 8.1, 10.1, 572.1, 539.12; 342/464; 204/403.01
See application file for complete search history.

(56) References Cited

U.S. PATENT DOCUMENTS

| | | | |
|---|---|---|---|
| 5,732,401 A | 3/1998 | Conway | |
| 5,812,865 A | 9/1998 | Theimer et al. | |
| 5,977,913 A | 11/1999 | Christ | |
| 7,123,149 B2 | 10/2006 | Nowak et al. | |
| 7,164,667 B2 | 1/2007 | Rayment et al. | |
| 7,197,326 B2 | 3/2007 | Acampora | |
| 7,312,752 B2 | 12/2007 | Smith et al. | |
| 7,324,824 B2 | 1/2008 | Smith et al. | |
| 7,366,120 B2 | 4/2008 | Handforth et al. | |
| 7,453,858 B2 | 11/2008 | Csapo et al. | |
| 7,466,985 B1 | 12/2008 | Handforth et al. | |
| 7,471,200 B2 | 12/2008 | Otranen | |
| 7,504,928 B2 | 3/2009 | Nierenberg et al. | |
| 7,545,326 B2 | 6/2009 | Caliri et al. | |
| 7,580,729 B2 | 8/2009 | Ozluturk | |
| 7,660,559 B2 | 2/2010 | Hersovich et al. | |
| 7,688,762 B2 | 3/2010 | Douglas et al. | |
| 2005/0021369 A1 | 1/2005 | Cohen et al. | |
| 2006/0055552 A1 | 3/2006 | Chung et al. | |

(Continued)

OTHER PUBLICATIONS

International Search Report and Written Opinion for PCT Application No. PCT/US2010/049413.

*Primary Examiner* — Kiet Doan
(74) *Attorney, Agent, or Firm* — Clause Eight IPS; Michael Catania

(57) ABSTRACT

The present invention provides a solution to mistaken location calculations based on multipath effects. The present invention determines a real-time location of an object in a facility using a combination of location algorithms, with a signal characteristic for a wireless signal from a communication device attached to the object received at a sensor of a mesh network. The location algorithms preferably include at least two of a proximity algorithm, a radial basis function algorithm, a maximum likelihood algorithm, a genetic algorithm, a minimum mean squared error algorithm, a radiofrequency fingerprinting algorithm, a multilateration algorithm, a time difference of arrival algorithm, a signal strength algorithm, a time of arrival algorithm, an angle of arrival algorithm, a spatial diversity algorithm, and a nearest neighbor algorithm.

12 Claims, 10 Drawing Sheets

U.S. PATENT DOCUMENTS

| | | |
|---|---|---|
| 2006/0056363 A1 | 3/2006 | Ratiu et al. |
| 2007/0194944 A1* | 8/2007 | Galera et al. ............... 340/686.6 |
| 2008/0012767 A1 | 1/2008 | Caliri et al. |
| 2008/0068267 A1 | 3/2008 | Huseth et al. |
| 2008/0081608 A1 | 4/2008 | Findikli et al. |
| 2008/0122696 A1* | 5/2008 | Huseth et al. ................. 342/464 |
| 2008/0133127 A1 | 6/2008 | Havens |
| 2008/0214203 A1* | 9/2008 | Titli et al. .................. 455/456.1 |
| 2009/0067333 A1 | 3/2009 | Ergen et al. |
| 2009/0069642 A1 | 3/2009 | Gao et al. |
| 2009/0190441 A1* | 7/2009 | Zhao et al. .................... 367/128 |
| 2009/0213730 A1 | 8/2009 | Zeng et al. |

* cited by examiner

WIRELESS TRACKING SYSTEM AND METHOD UTILIZING MULTIPLE LOCATION ALGORITHMS

CROSS REFERENCES TO RELATED APPLICATIONS

The Present application claims priority to U.S. Provisional Patent Application No. 61/386,601, filed on Sep. 27, 2010, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention is related to wireless tracking systems and methods. More specifically, the present invention relates to a system and method for determining a real-time location of an object utilizing multiple location algorithms.

2. Description of the Related Art

The ability to quickly determine the location of objects located within a facility is becoming a necessity of life. To the uninformed observer, the placement of transponders, also known as tags, on numerous non-stationary objects whether in an office or home would appear to be an unnecessary use of resources. However, the uninformed observer fails to appreciate the complexity of modern life and the desire for efficiency, whether at the office or home.

For example, in a typical hospital there are numerous shifts of employees utilizing the same equipment. When a new shift arrives, the ability to quickly locate medical equipment not only results in a more efficient use of resources, but also can result in averting a medical emergency. Thus, the tracking of medical equipment in a hospital is becoming a standard practice.

The tracking of objects in other facilities is rapidly becoming a means of achieving greater efficiency. A typical radio frequency identification system includes at least multiple tagged objects each of which transmits a signal, multiple receivers for receiving the transmissions from the tagged objects, and a processing means for analyzing the transmissions to determine the locations of the tagged objects within a predetermined environment. The tags can also receive signals.

Several prior art references discloses various tracking systems.

McKee et al., U.S. Pat. No. 6,915,135 discloses a system for determining presence, identity and duration of presence in a given area (a table in a restaurant) of an object (tag attached to a waiter).

Lester, U.S. Pat. No. 3,805,265 discloses a location system that uses line-of-sight radiant wave energy for signal transmission.

Schwengler U.S. Pat. No. 7,050,819, is directed at the problem of adequate power for a mobile telephone for a two-way communication function or a regeneration function as a node of a mesh network.

Christ, U.S. Pat. No. 5,977,913, discloses a radiofrequency system that is utilized within a prison and allows for an individual to be located after an alarm is triggered by the individual.

Zodnik, U.S. Patent Publication Number 2004/0147232, discloses wall-mounted (RJ-11 or RJ-45) wireless transceivers configured to only track the location of a self-identified wireless communication device in order to communicate the location of the self-identified wireless communication device to an emergency service such as 911.

One exemplary method triangulates the strongest received signals to determine the location of a tagged object. This method is based on the assumption that the receivers with the strongest received signals are the ones located closest to the tagged object. However, such an assumption is sometimes erroneous due to common environmental obstacles. Multipath effects can result in a further located receiver having a stronger received signal from a tagged object than a more proximate receiver to the tagged object, which can result in a mistaken location determination. The prior art has disclosed various means for overcoming multipath effects.

Tekinay, U.S. Pat. No. 6,259,894 for a Method For Improved Line-Of-Sight Signal Detection Using RF Model Parameters, discloses a method for reducing time-shift due to multipathing for a RF signal in an RF environment.

Close, U.S. Pat. No. 3,869,673 for a Method And Apparatus For Measuring Multipath Distortion, discloses a method for indicating multipath distortion in a received signal.

Lennen, U.S. Pat. No. 5,402,450 for a Signal Timing Synchronizer, discloses a method and apparatus for reducing the effects of multipath induced distortions on the accuracy of detecting the time of arrival of a received signal.

Fortune et al., U.S. Pat. No. 5,450,615 for a Prediction Of Indoor Electromagnetic Wave Propagation For Wireless Indoor Systems, discloses techniques for predicting RF propagation within a structure.

Other prior art references have disclosed the use of varying energy levels. For instance, Nakanishi, U.S. Pat. No. 5,451,847 for a Variable Energy Radio Frequency Quadrupole Linac discloses changing radio frequency energy levels to emitted focused and accelerated beams.

Kaewell, Jr. et al., U.S. Pat. No. 7,082,286 for a Path Searcher Using Reconfigurable Correlator Sets discloses producing a path profile for a user based on sorted output energy levels.

Fernabdez-Cobaton et al., U.S. Pat. No. 6,697,417 for a System And Method Of Estimating Earliest Arrival Of CDMA Forward And Reverse Link Signals discloses a mobile station receiver that detects the arrival times and energy levels of received signals, and constructs a searcher histogram and a finger histogram associated with each pilot signal.

The prior art has yet to resolve mistaken location calculations based on multipath effects for objects tracked within an indoor facility.

BRIEF SUMMARY OF THE INVENTION

The present invention provides a solution to mistaken location calculations based on multipath effects. The present invention determines a real-time location of an object in a facility using a combination of location algorithms, with a signal characteristic for a wireless signal from the object received at a sensor of a mesh network.

One aspect of the present invention is a method for determining a real-time location of an object within a facility using a combination of location algorithms. The method includes transmitting a wireless signal from a communication device associated with an object. The method also includes receiving the wireless signal at least one sensor positioned within a facility. The method also includes determining a real-time location of the object in the facility using a combination of location algorithms with a power value for the wireless signal received at the at least one sensor.

Preferably the location algorithms preferably include at least two of a proximity algorithm, a radial basis function algorithm, a maximum likelihood algorithm, a genetic algorithm, a minimum mean squared error algorithm, a radiofrequency fingerprinting algorithm, a multilateration algorithm, a time difference of arrival algorithm, a signal strength algorithm, a time of arrival algorithm, an angle of arrival algorithm, a spatial diversity algorithm, and a nearest neighbor algorithm. The location algorithms alternatively include at least one of a voting algorithm, an averaging algorithm and a confidence algorithm. The at least one sensor forwards the wireless signal to a plurality of location engines. Each of the plurality of location engines determines a real-time location of the object using a location algorithm. Determining a real-time location of the object in the facility using a combination of location algorithms preferably comprises using a first algorithm if the object is detected in an in-room area and has a threshold received signal strength indication ("RSSI"), and using a second algorithm if the object is not in an in-room area or a threshold RSSI is not detected. The wireless first power level signal is preferably one of light, radiofrequency, sound and magnetic energy. Each of the plurality of location engines is preferably located at a single server. The method alternatively further includes associating the transmitting object with a second object. The method alternatively further includes triggering an event. The event is preferably at least one of commencing a workflow event, changing the status of a workflow process, transmitting an alert, transmitting a report, changing the status of a computer, activating a camera, and changing the state of light.

The method further includes associating the object with a second object. The method further includes triggering an event such as commencing a workflow event, transmitting an alert, transmitting a report, logging onto a computer, logging off of a computer, activating a camera, and activating a light.

Another aspect of the present invention is a system for determining a real-time location of an object within a facility. The system preferably includes objects, sensors and location engines. Each of the objects comprises a communication device which transmits a wireless signal. Each of the sensors is positioned within the facility, and at least one of the sensors receives the wireless signal. Each of the location engines is in communication with each of the sensors. Each of the location engines determines a real-time location of the object from the wireless signal utilizing a location algorithm.

Location algorithms for each of the location engines preferably includes at least two of a proximity algorithm, a radial basis function algorithm, a maximum likelihood algorithm, a genetic algorithm, a minimum mean squared error algorithm, a radiofrequency fingerprinting algorithm, a multilateration algorithm, a time difference of arrival algorithm, a signal strength algorithm, a time of arrival algorithm, an angle of arrival algorithm, a spatial diversity algorithm, and a nearest neighbor algorithm. The object is preferably a medical device or a person. A location algorithm for each of the location engines alternatively includes at least one of a voting algorithm, an averaging algorithm and a confidence algorithm.

Yet another aspect of the present invention is a method for determining a real-time location of an object within a facility. The method includes receiving a wireless signal from a communication device of an object at least one of a plurality of sensors positioned within a facility. The method also includes forwarding the wireless signal from the at least one of a plurality of sensors to a first location engine. The method also includes forwarding the wireless signal from the at least one of a plurality of sensors to a second location engine. The method also includes calculating a real-time location of the object from the wireless signal utilizing a first location algorithm at the first location engine. The method also includes calculating a real-time location of the object from the wireless signal utilizing a second location algorithm at the second location engine. The method also includes determining a real-time location of the object using the calculation from the first location engine and the calculation from the second location engine.

The first location algorithm is preferably one of a proximity algorithm, a radial basis function algorithm, a maximum likelihood algorithm, a genetic algorithm, a minimum mean squared error algorithm, a radiofrequency fingerprinting algorithm, a multilateration algorithm, a time difference of arrival algorithm, a signal strength algorithm, a time of arrival algorithm, an angle of arrival algorithm, a spatial diversity algorithm, and a nearest neighbor algorithm. The second location algorithm is preferably one of a proximity algorithm, a radial basis function algorithm, a maximum likelihood algorithm, a genetic algorithm, a minimum mean squared error algorithm, a radiofrequency fingerprinting algorithm, a multilateration algorithm, a time difference of arrival algorithm, a signal strength algorithm, a time of arrival algorithm, an angle of arrival algorithm, a spatial diversity algorithm, and a nearest neighbor algorithm. The wireless signal is preferably one of light, radiofrequency, sound and magnetic energy. The first location algorithm or the second location algorithm is alternatively at least one of a voting algorithm, an averaging algorithm and a confidence algorithm.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
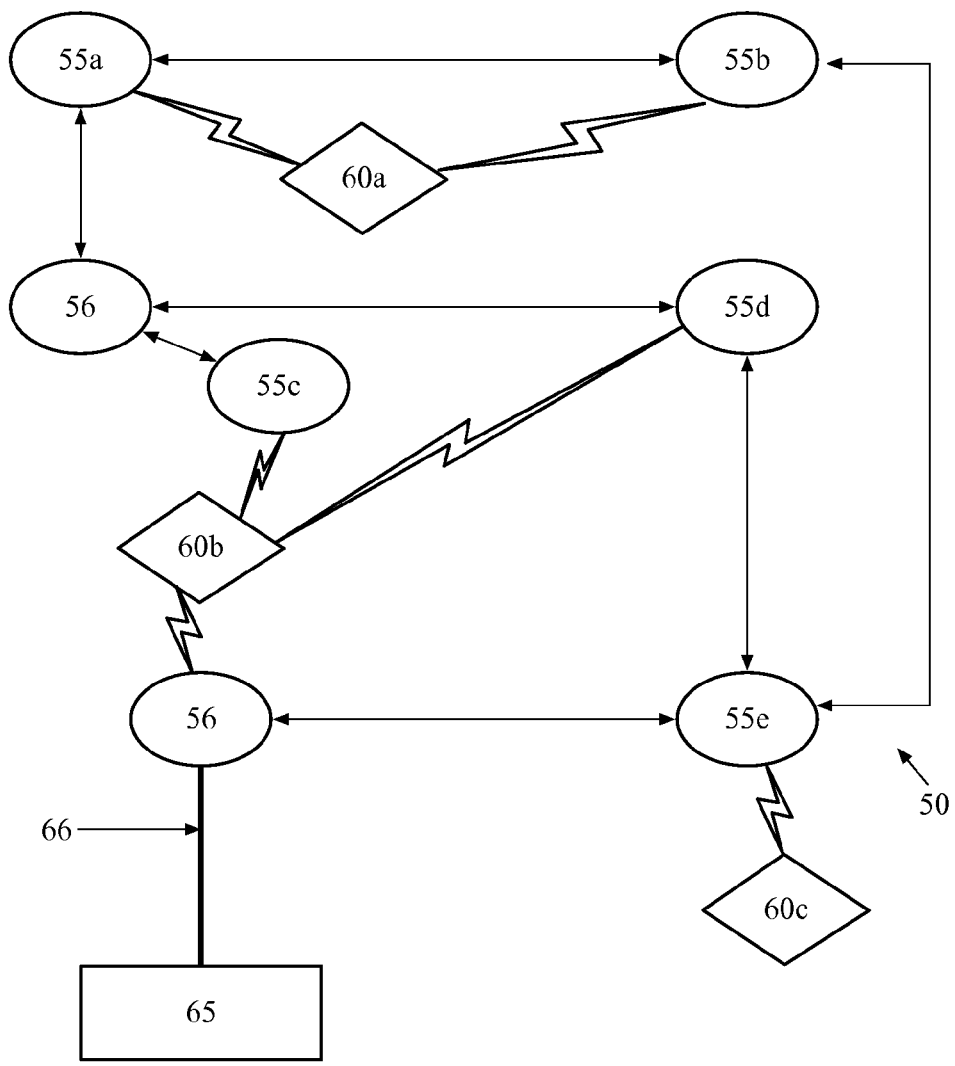
FIG. 1 is schematic view of a system for determining a real-time location of an object within a facility.
Figure 2:
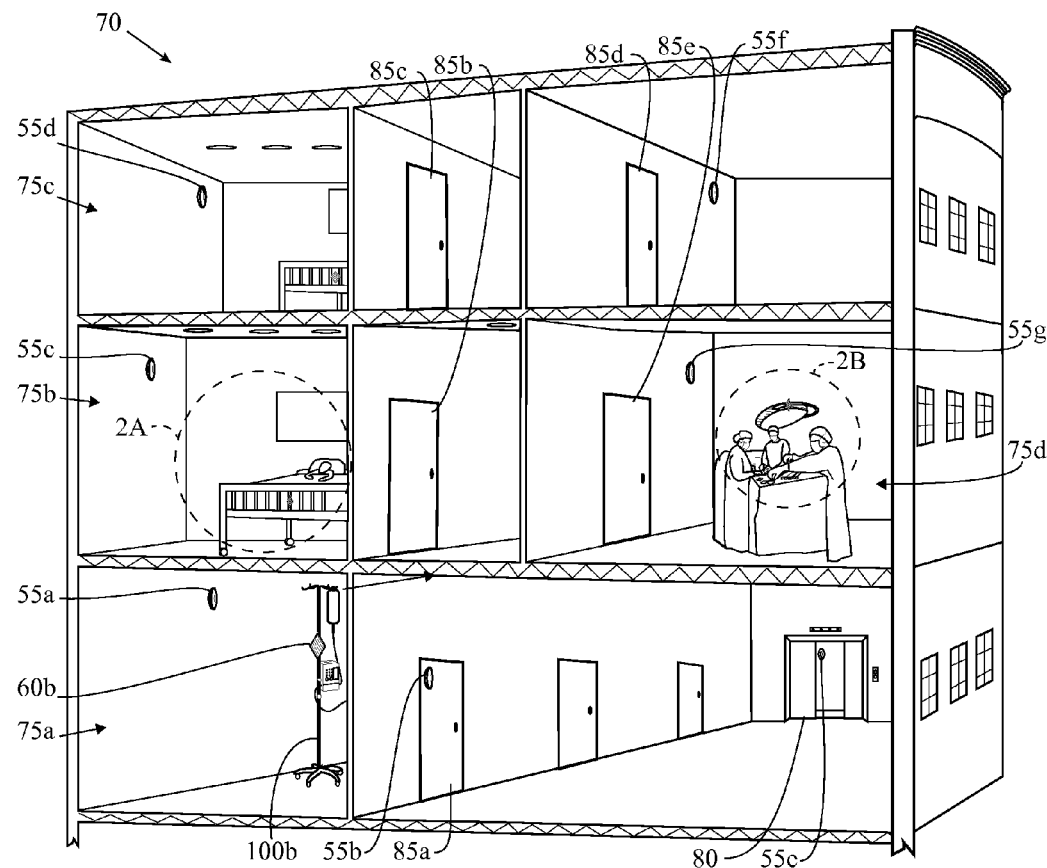
FIG. 2 is a multi-floor view of a facility employing a system for determining a real-time location of an object within a facility.
Figure 2A:
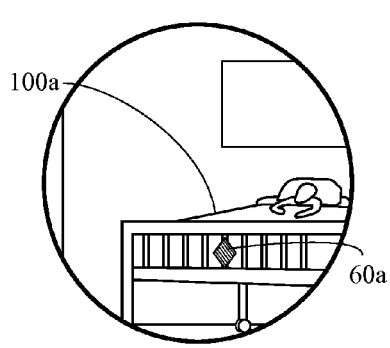
FIG. 2A is an isolated enlarged view of circle 2A of FIG. 2.
Figure 2B:
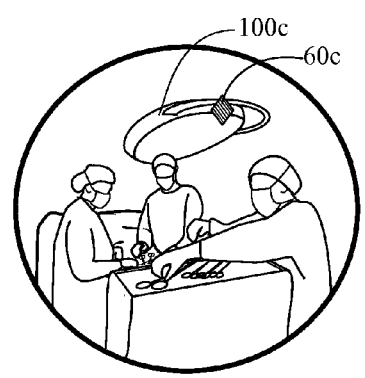
FIG. 2B is an isolated enlarged view of circle 2B of FIG. 2.
Figure 3:
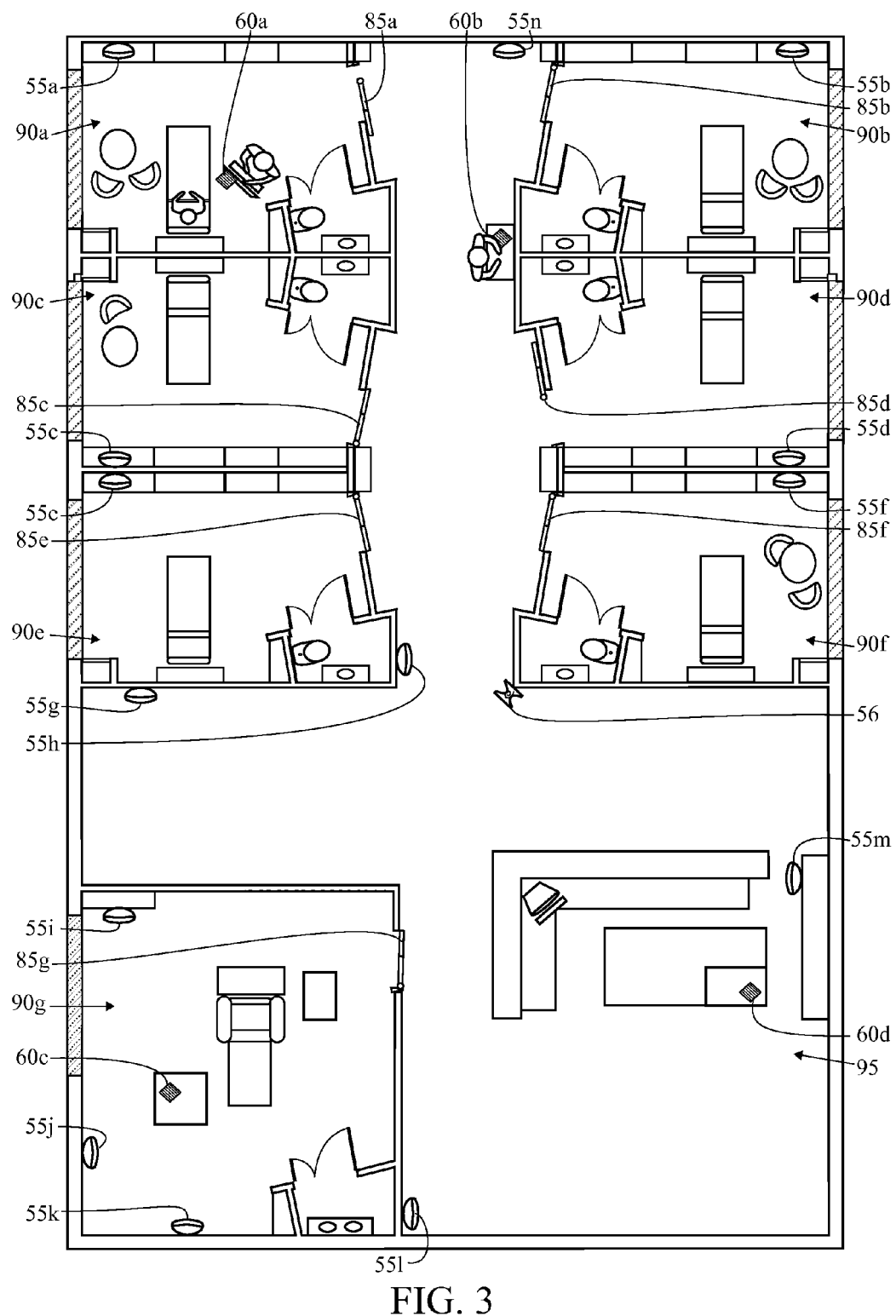
FIG. 3 is a floor plan view of a single floor in a facility employing the system for determining a real-time location of an object within a facility.

As shown in FIGS. 1-4, a system for tracking objects and persons within a facility is generally designated 50. The system 50 is capable of determining a real-time location of an object 100 within a facility 70. The system 50 preferably includes a plurality of sensors 55, a plurality of bridges 56, a plurality of communication devices 60 and at least one locating engine 65 which includes a processor for calculating the real-time location of objects within the facility 70 utilizing information provided by the sensors 55. One example of the components of the system 50 is disclosed in U.S. Pat. No. 7,197,326, for a Wireless Position Location And Tracking System, which is hereby incorporated by reference in its entirety. A more specific example of the sensors 55 is disclosed in U.S. Pat. No. 7,324,824, for a Plug-In Network Appliance, which is hereby incorporated by reference in its entirety.

The system 50 is preferably employed at a facility 70 such as a business office, factory, home, hospital and/or government agency building. The system 50 is utilized to track and locate various objects and/or persons positioned throughout the facility 70. A communication device 60 is attached to an object or person. The communication devices 60 preferably continuously transmit signals on a predetermined time cycle, and these signals are received by sensors 55 positioned throughout the facility 70. Alternatively, the communication devices 60 transmit signals in a random, ad-hoc or dynamic manner, and these signals are received by the sensors 55 positioned throughout the facility 70. As discussed below, in order to mitigate multipath effects, the communication devices 60 transmit signals at various power levels. The sensors 55 transmit the data from the communication devices 60 to a bridge 56 for transmission to a locating engine 65. If a sensor 55 is unable to transmit to a bridge 56, the sensor 55 may transmit to another sensor 55 in a mesh network-like system for eventual transmission to a bridge 56. In a preferred embodiment, a transmission is sent from a transmission distance of six sensors 55 from a bridge 56. Alternatively, a transmission is sent from a transmission distance ranging from ten to twenty sensors 55 from a bridge 56. The locating engine 65 preferably continuously receives transmissions from the sensors 55 via the bridges 56 concerning the movement of objects 100 bearing a communication devices 60 within the facility 70. The locating engine 65 processes the transmissions from the sensors 55 and calculates a real-time position for each of the objects 100 bearing a communication device 60 within the facility 70 utilizing multiple location algorithms. The real-time location information for each of the objects 100 bearing a communication device 60 is preferably displayed on an image of a floor plan of the facility 70, or if the facility 70 has multiple floors, then on the floor plan images of the floors of the facility 70. The floor plan image may be used with a graphical user interface of a computer, personal digital assistant, or the like so that an individual of the facility 70 is able to quickly locate objects 100 within the facility 70.

As shown in FIG. 1, the system 50 utilizes sensors 55 to monitor and identify the real-time position of non-stationary objects or persons bearing or integrated with communication devices 60. The sensors 55a-f preferably form a mesh network and wirelessly communicate with each other (shown as double arrow lines) and with at lest one locating engine 65, preferably through a wired connection 66 via at least one bridge 56, such as disclosed in the above-mentioned U.S. Pat. No. 7,324,824 for a Plug-In Network Appliance. The communication devices 60a-c transmit signals at various power levels (shown as dashed lines) which are received by the sensors 55a-e, which then transmit signals to bridges 56 for eventual transmission to a central processor 65. The locating engine(s) 65 is/are preferably located on-site at the facility 70. However, the system 50 may also include an off-site locating engine(s) 65, not shown. Those skilled in the pertinent art will recognize that a single server may include more than one locating engine 65.

In a preferred embodiment, each communication device 60 preferably transmits a radio frequency signal of approximately 2.48 GigaHertz ("GHz"). The communication format is preferably IEEE Standard 802.15.4. Alternatively, each communication device 60 transmits an infrared signal, an ultrasound signal or a magnetic signal. Each communication device 60 preferably transmits at a plurality of transmission power levels, preferably ranging from two to twenty different transmission power levels (energy levels), more preferably from two to ten different transmission power levels, and most preferably two different transmission power levels. Alternatively, the transmission power levels are the same. The number of communication device transmission power levels varies depending on data transmission constraints and time constraints for the system. In one preferred embodiment, the first power level is approximately 1 milli-Watt and the second power level is approximately 0.5 milli-Watt. In a preferred embodiment, the communication device 60 transmits each signal at a different power level before transmitting again at the original power level. Alternatively, the communication device 60 transmits at a sequence of power levels that can be predicted by the sensors 55, bridges 56 and/or central processor 65. For example, the communication device 60 transmits a first signal at a first power level and the next signal at a second power level. Those skilled in the pertinent art will recognize that the communication devices 60 may operate at various frequencies and mediums (infrared, ultrasound and others) without departing from the scope and spirit of the present invention.

As shown in FIGS. 2, 2A, 2B, 3 and 4, the facility 70 is depicted as a hospital. The facility 70 has a multitude of floors 75a-c. An elevator 80 provides access between the various floors 75a, 75b and 75c. Each floor 75a, 75b and 75c has a multitude of rooms 90a-i, with each room 90 accessible through a door 85. Positioned throughout the facility 70 are sensors 55a-o for obtaining readings from communication devices 60a-d attached to or integrated into non-stationary objects 100a, 100b (see FIGS. 2 and 4). A bridge 56 is also shown for receiving transmissions from the sensors 55 for processing by the central processor 65. The sensor 55 may have an antenna architecture such as disclosed in U.S. patent application Ser. No. 12/554,814 for Antenna Diversity For Wireless Tracking System And Method, which is hereby incorporated by reference in its entirety.

Figure 4:
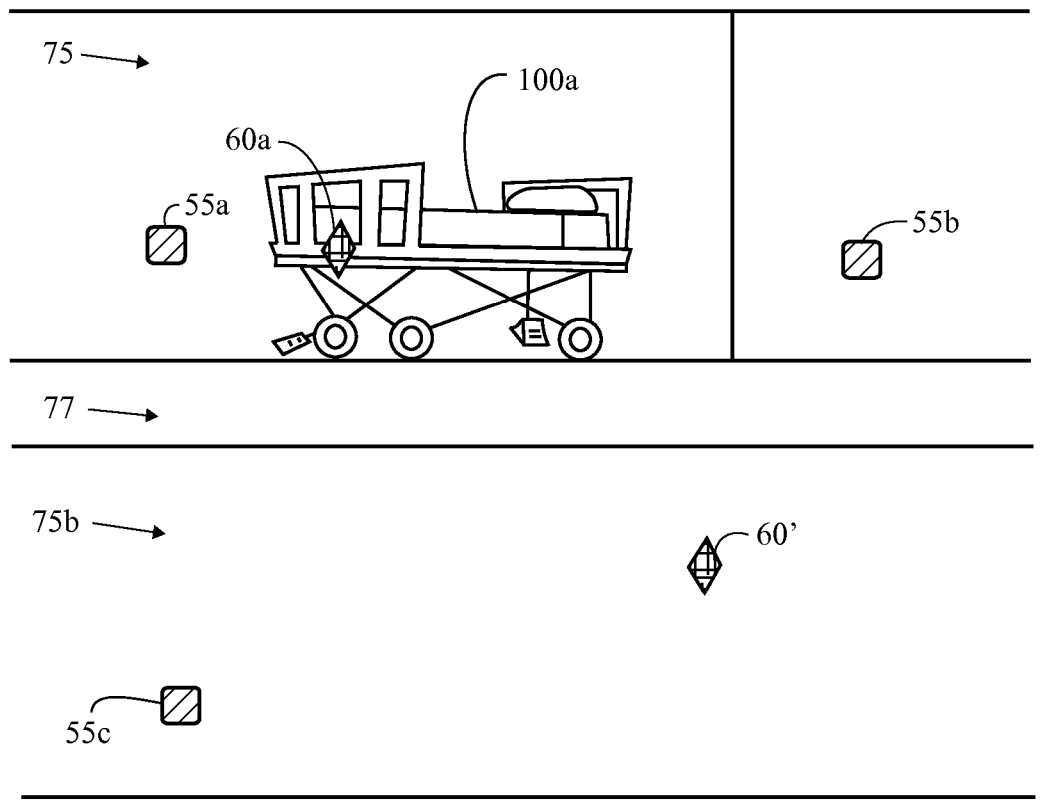
FIG. 4 is a two-floor view of a facility including a tagged object and sensors of a system for determining a real-time location of an object within a facility.

As shown in FIG. 4, the communication device 60a is attached to movable bed 100a positioned on an upper floor 75c. The communication device 60a transmits a signal which is received by sensors 55a, 55b and 55c. If the signal to the sensor 55c is the strongest, then an analysis of the readings from the sensors 55a-c may place the communication device 60a, and thus the movable bed 100a, at position 60' on the lower floor 75b. This type of faulty reading would likely occur with triangulation. To prevent such a faulty positioning reading, the present invention processes the readings preferably according to a method which eliminates the reading from sensor 55c from the location calculation for movable bed 100a.

Figure 5:
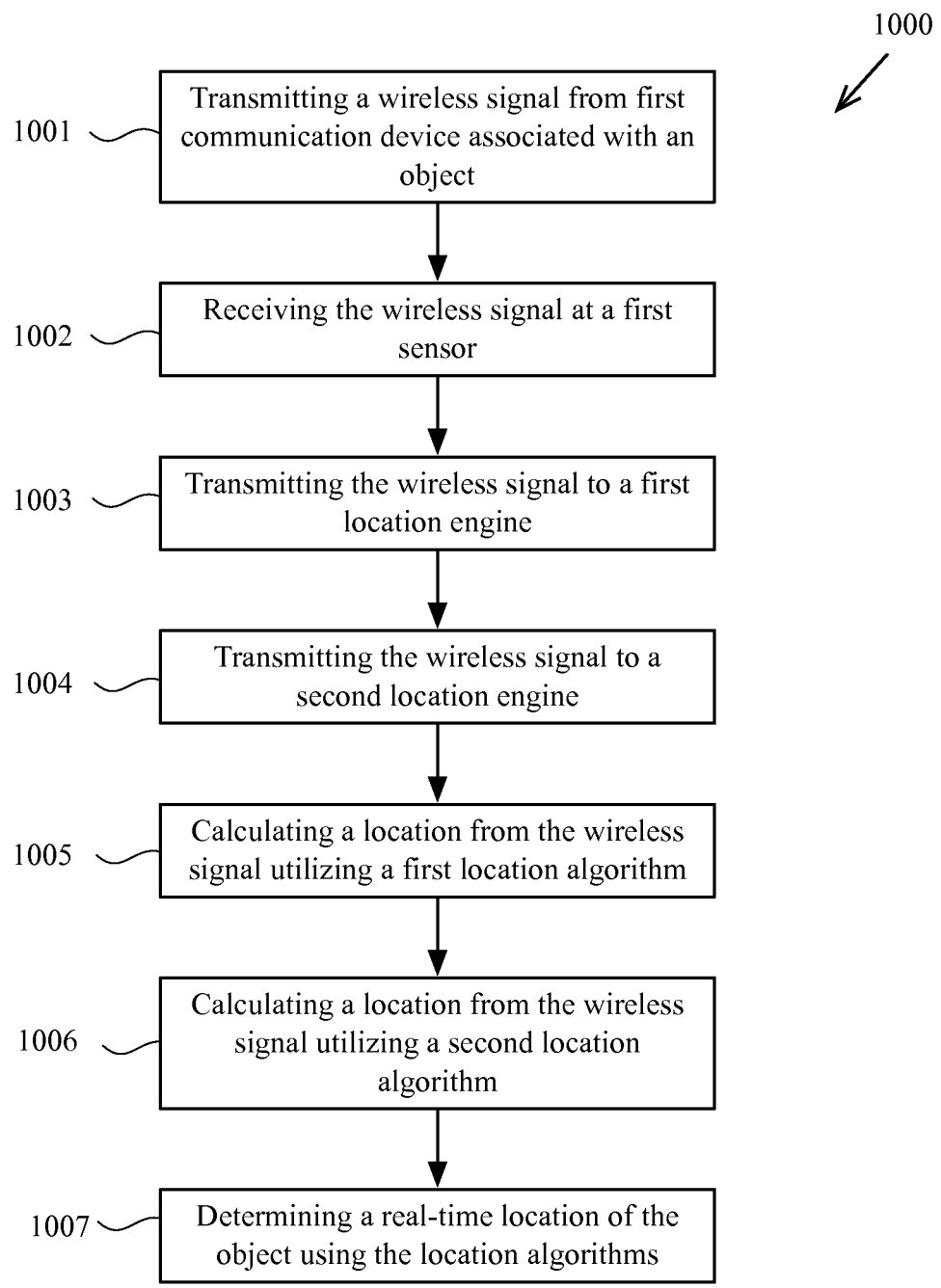
FIG. 5 is a flow chart of a method determining a real-time location of an object within a facility.

A method 1000 for determining a real-time location of an object within a facility is illustrated in FIG. 5. At block 1001, a wireless signal is transmitted form a first communication device associated with an object. At block 1002, the wireless signal is received at a first sensor. At block 1003, the wireless signal is transmitted to a first location engine. At block 1004, the wireless signal is transmitted to a second location engine.

At block 1005, a location is calculated from the wireless signal utilizing a first location algorithm. At block 1006, a location is calculated from the wireless signal utilizing a second location algorithm. At block 1007, a real-time location of the object is determined using the location algorithms. The first location algorithm is preferably one of a proximity algorithm, a radial basis function algorithm, a maximum likelihood algorithm, a genetic algorithm, a minimum mean squared error algorithm, a radiofrequency fingerprinting algorithm, a multilateration algorithm, a time difference of arrival algorithm, a signal strength algorithm, a time of arrival algorithm, an angle of arrival algorithm, a spatial diversity algorithm, and a nearest neighbor algorithm. The second location algorithm is preferably one of a proximity algorithm, a radial basis function algorithm, a maximum likelihood algorithm, a genetic algorithm, a minimum mean squared error algorithm, a radiofrequency fingerprinting algorithm, a multilateration algorithm, a time difference of arrival algorithm, a signal strength algorithm, a time of arrival algorithm, an angle of arrival algorithm, a spatial diversity algorithm, and a nearest neighbor algorithm.

Figure 6:
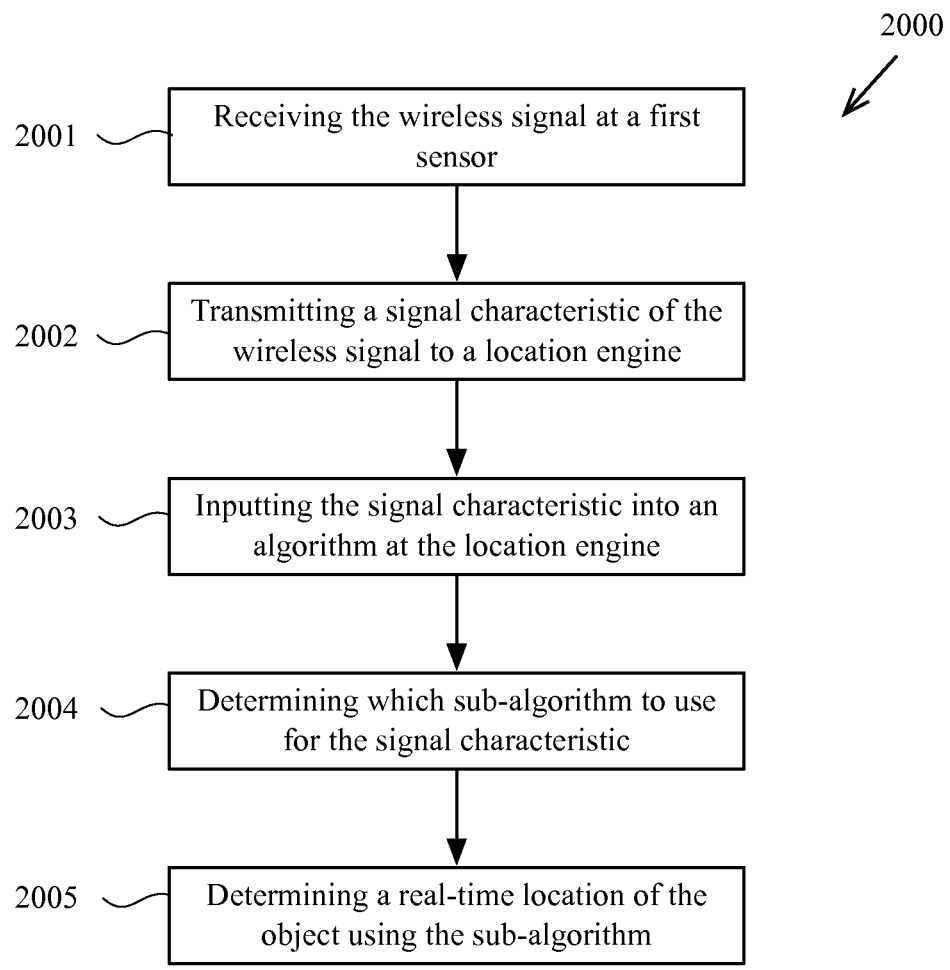
FIG. 6 is a flow chart of a method determining a real-time location of an object within a facility.

Another method 2000 for determining a real-time location of an object within a facility is illustrated in FIG. 6. At block 2001, a wireless signal is received at a first sensor. At block 2002, a signal characteristic of the wireless signal is transmitted to a location engine. At block 2003, the signal characteristic is inputted into an algorithm at the location engine. At block 2004, a determination is made for which sub-algorithm to use for the signal characteristic. At block 2005, a real-time location of the object is determined using the sub-algorithm. A sub-algorithm is an algorithmic module which is complete in itself and is used or called by a primary algorithm or by some other sub-algorithm. The sub-algorithm may or may not receive values from the primary algorithm. The sub-algorithm performs its task and then sends the result to the primary algorithm.

Figure 7:
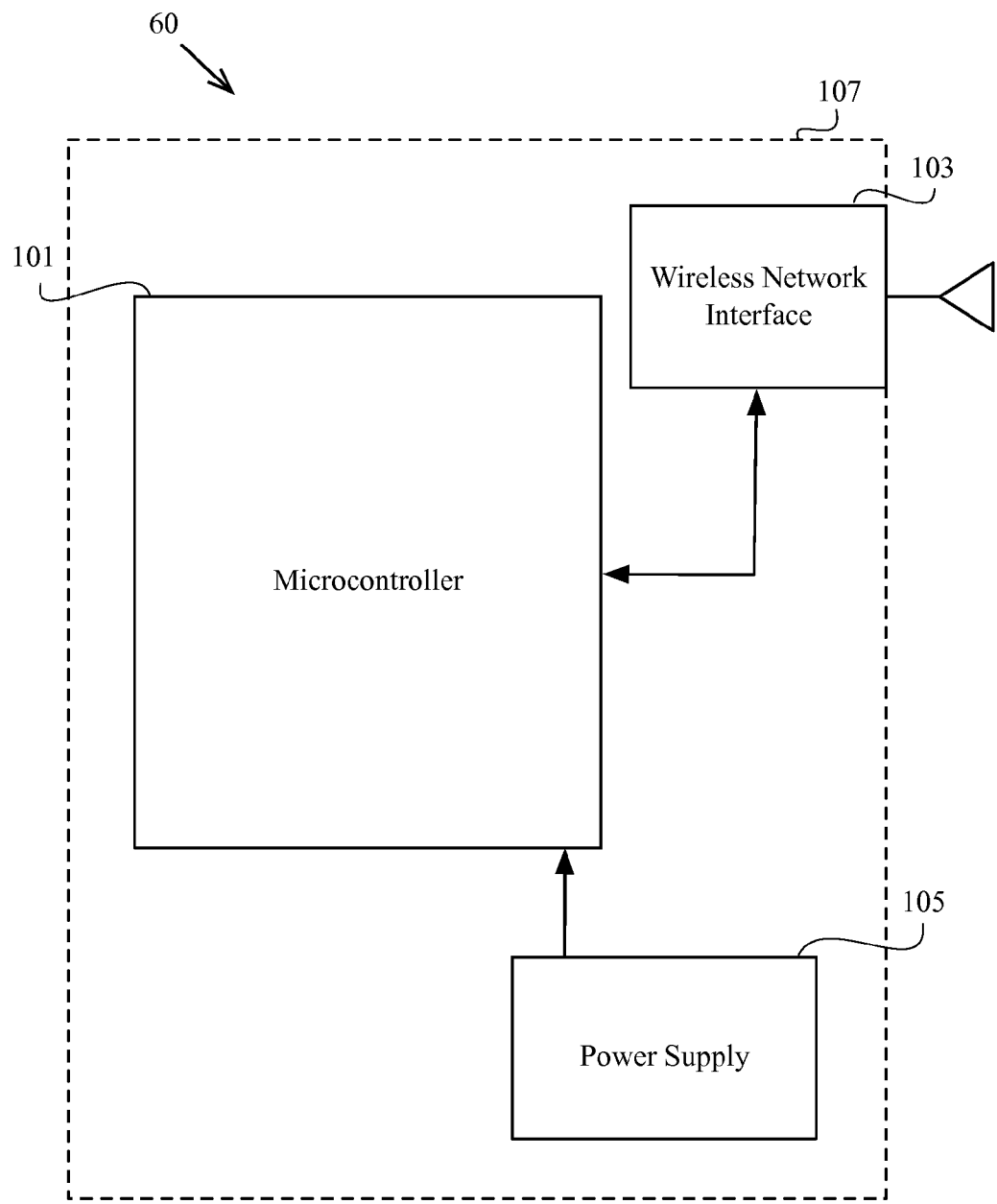
FIG. 7 is a block diagram of a communication device employing variable radiofrequency power level transmissions.
Figure 8:
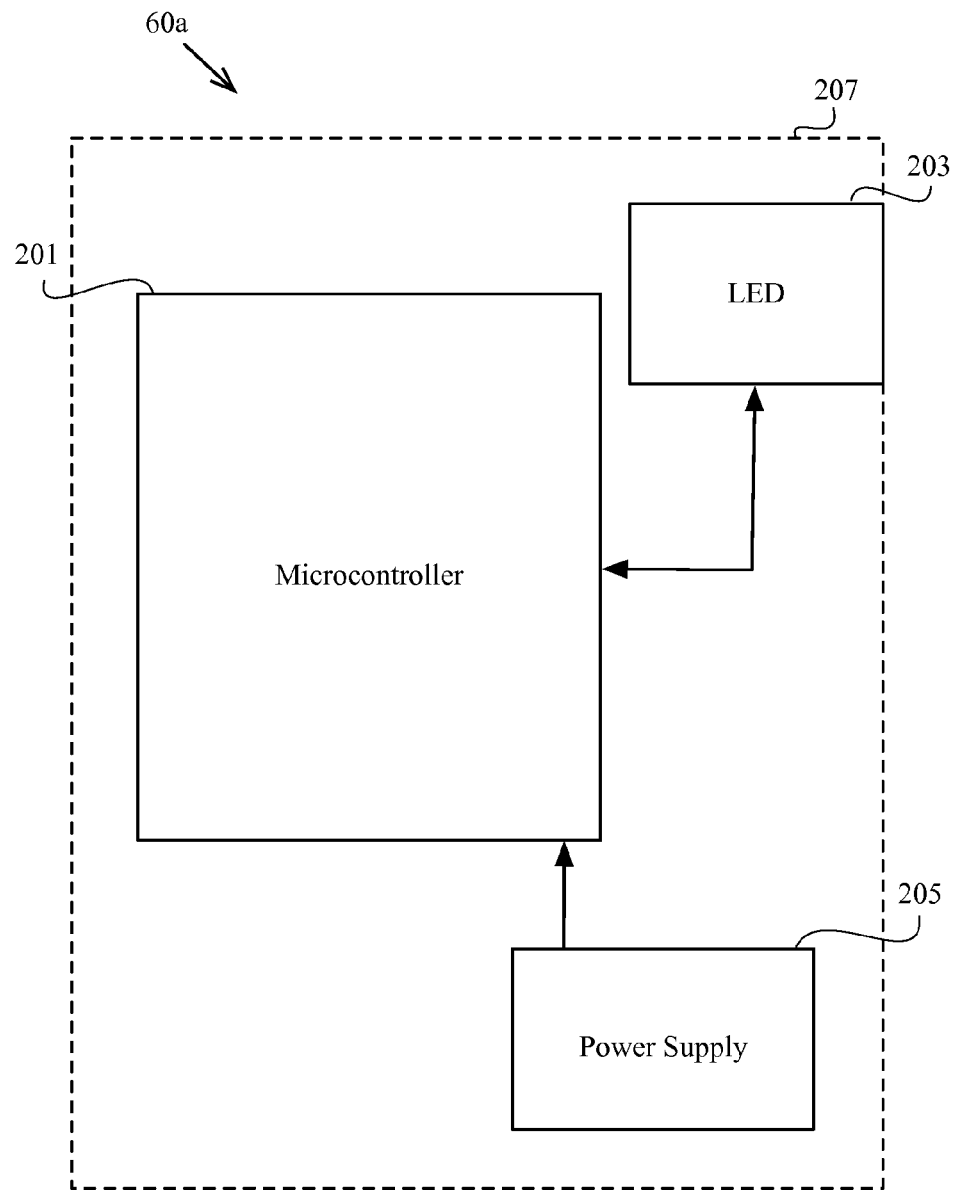
FIG. 8 is a block diagram of a communication device employing variable light intensity level transmissions.

A communication device 60 that utilizes different power levels of radiofrequency signals is illustrated in FIG. 7. A microcontroller 101 has programmed software to modify power levels from transmission to transmission. The transmissions are transmitted through transceiver (wireless network interface) 103. A power supply 105 provides power to the device 60. All of the components are preferably contained within a housing 107. The communication device 60 utilizes different power levels of radiofrequency and preferably operates at a communication format that preferably includes IEEE Standard 802.15.4, ZIGBEE, BLUETOOTH, BLUETOOTH low energy, WiFi, Low-power WiFi, Ultrasound and Infrared communication formats. Those skilled in the pertinent art will recognize that other communication formats may be used with departing from the scope and spirit of the present invention. The communication format also allows the communication device 60 to communicate with the sensors 55 to transmit information. The communication device 60 may also operate at a short range communication format of magnetic induction, 9 kHz, <125 kHz, 125 kHz RFID, 13.56 MHz, 433 MHz, 433 MHz RFID, and 900 MHz RFID, and preferably at a bit rate of less 256 kilobits per second or approximately 426 kilobits per second A communication device 60a that utilizes different power levels of light is illustrated in FIG. 8. A microcontroller 201 has programmed software to modify power levels from transmission to transmission. The transmissions are transmitted through LED 203, preferably an infrared transceiver. A power supply 205 provides power to the device 60a. All of the components are preferably contained within a housing 207. In utilizing the communication device 60a of FIG. 8, each sensor 55 of the mesh network preferably includes a photodetector capable of detecting infrared transmissions.

Figure 9:
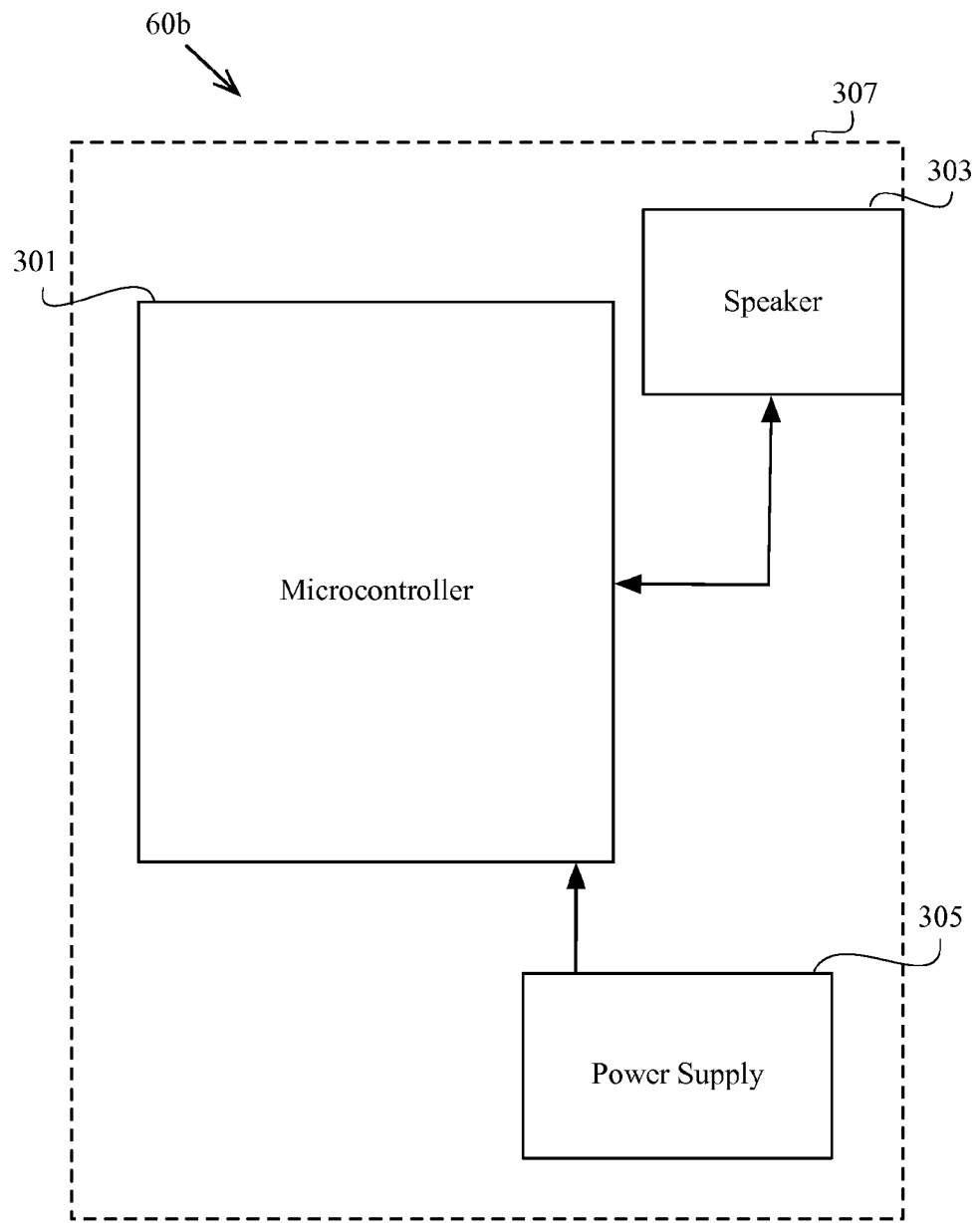
FIG. 9 is a block diagram of a communication device employing variable sound level transmissions.

A communication device 60b that utilizes different power levels of sound is illustrated in FIG. 9. A microcontroller 301 has programmed software to modify power levels from transmission to transmission. The transmissions are transmitted through a speaker device 303, preferably an ultrasound transducer. A power supply 305 provides power to the device 60b. All of the components are preferably contained within a housing 307. In utilizing the communication device 60b of FIG. 9, each sensor 55 of the mesh network preferably includes a microphone capable of detecting audible transmissions from the speaker 303.

Figure 10:
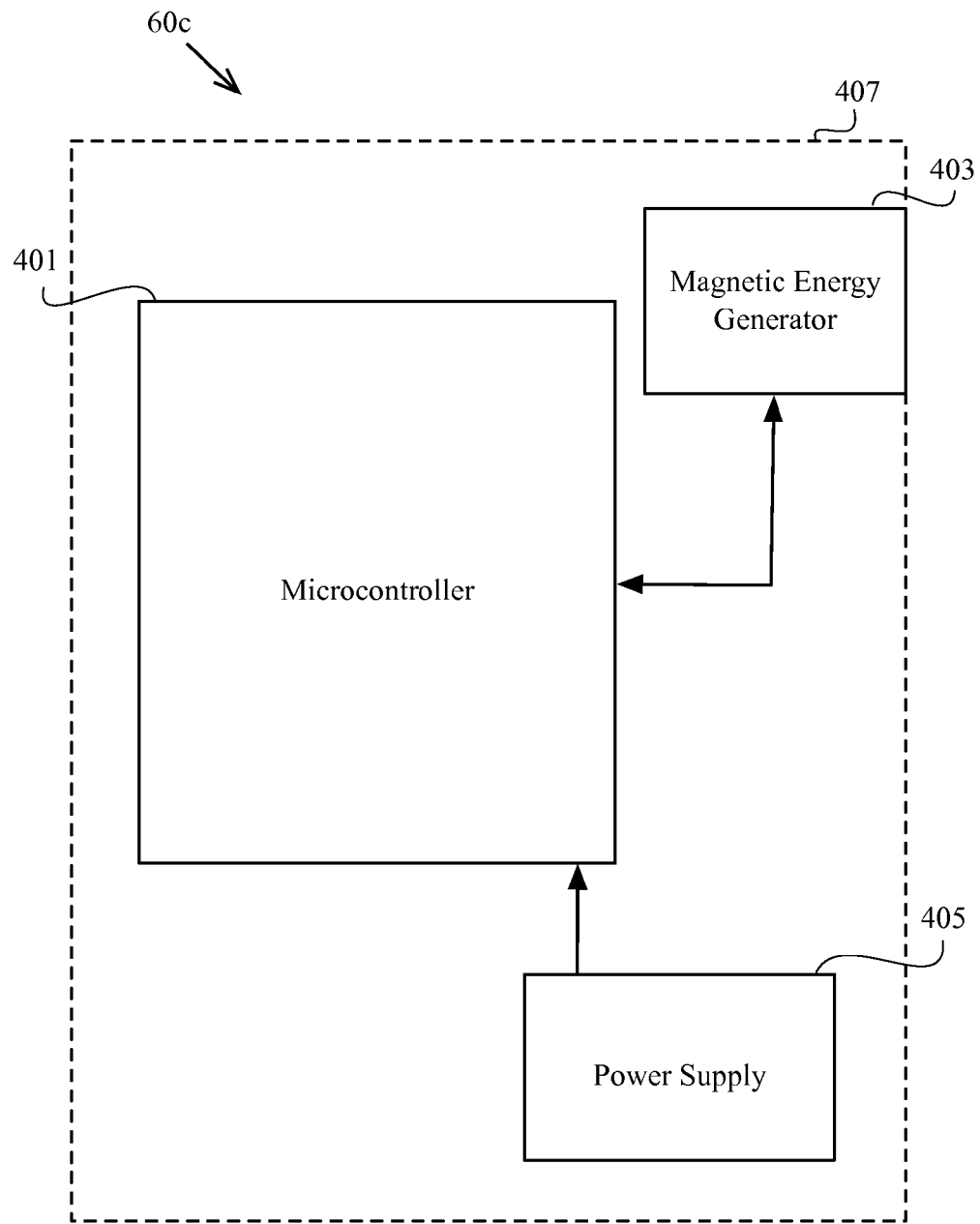
FIG. 10 is a block diagram of a communication device employing variable magnetic energy level transmissions.

A communication device 60c that utilizes different power levels of magnetic energy is illustrated in FIG. 10. A microcontroller 401 has programmed software to modify power levels from transmission to transmission. The transmissions are transmitted through a magnetic energy generator 403, preferably an electromagnetic transceiver. A power supply 405 provides power to the device 60c. All of the components are preferably contained within a housing 407. In utilizing the communication device 60c of FIG. 10, each sensor 55 of the mesh network preferably includes a magnet capable of detecting magnetic energy transmissions from the magnetic energy generator 403.

The communication device 60 may also include near-field communication capabilities such as disclosed in Perkins et al., U.S. Pat. No. 7,941,096 for a Wireless Tracking System And Method Utilizing Near-Field Communication Devices, which is hereby incorporated by reference in its entirety. The communication device 60 may also include peer-to-peer communication capabilities such as disclosed in Perkins, U.S. patent application Ser. No. 12/484,236, filed on Jun. 14, 2009, for a Wireless Tracking System And Method For Analyzing An Interaction Between Objects, which is hereby incorporated by reference in its entirety. The communication device 60 may also be sterilizable such as disclosed Caliri et al., U.S. Pat. No. 7,636,046 for a Wireless Tracking System And Method With Extreme Temperature Resistant Tag, which is hereby incorporated by reference in its entirety, or Perkins et al., U.S. patent application Ser. No. 12/484,234, filed on Jun. 14, 2009, for a Wireless Tracking System And Method For Sterilizable Object, which is hereby incorporated by reference in its entirety. The mesh network may also backhaul information such as disclosed in Perkins, U.S. patent application Ser. No. 12/982,832, filed on Dec. 30, 2011, for a Wireless Tracking System And Method For Backhaul Of Information, which is hereby incorporated by reference in its entirety. The communication device 60 may be designed to avoid multipath errors such as disclosed in Nierenberg et al., U.S. Pat. No. 7,504,928 for a Wireless Tracking System And Method Utilizing Tags With Variable Power Level Transmissions, which is hereby incorporated by reference in its entirety.

The real-time location of an object within the facility is preferably determined using multiple location algorithms. The first location algorithm is preferably one of a proximity algorithm, a radial basis function algorithm, a maximum likelihood algorithm, a genetic algorithm, a minimum mean squared error algorithm, a radiofrequency fingerprinting algorithm, a multilateration algorithm, a time difference of arrival algorithm, a signal strength algorithm, a time of arrival algorithm, an angle of arrival algorithm, a spatial diversity algorithm, and a nearest neighbor algorithm. The second location algorithm is preferably one of a proximity algorithm, a radial basis function algorithm, a maximum likelihood algorithm, a genetic algorithm, a minimum mean squared error algorithm, a radiofrequency fingerprinting algorithm, a multilateration algorithm, a time difference of arrival algorithm, a signal strength algorithm, a time of arrival algorithm, an angle of arrival algorithm, a spatial diversity algorithm, and a nearest neighbor algorithm. The wireless signal is preferably one of light, radiofrequency, sound and magnetic energy. The first location algorithm or the second location algorithm is alternatively at least one of a voting algorithm, an averaging algorithm and a confidence algorithm.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A method for determining a real-time location of an object within a facility, the method comprising:
   transmitting a wireless signal from a communication device associated with an object;
   receiving the wireless signal at least one of a plurality of sensors positioned within a facility, the plurality of sensors forming a mesh network;
   forwarding the wireless signal from the mesh network to each of the plurality of location engines; and
   determining a real-time location of the object in the facility at each of the plurality of location engines, each of the plurality of location engines using an algorithm comprising a plurality of location sub-algorithms with a signal characteristic for the wireless signal received at the at least one of a plurality of sensors, wherein the signal characteristic is a power value, an angle, or an ultrasound phase,
   wherein the plurality of location sub-algorithms comprise at least one of a voting algorithm, an averaging algorithm and a confidence algorithm.

2. The method according to claim 1 wherein the plurality of location sub-algorithms includes at least two of a proximity algorithm, a radial basis function algorithm, a maximum likelihood algorithm, a genetic algorithm, a minimum mean squared error algorithm, a radiofrequency fingerprinting algorithm, a multilateration algorithm, an angle of arrival algorithm, a spatial diversity algorithm, and a nearest neighbor algorithm.

3. The method according to claim 1 wherein determining a real-time location of the object in the facility at each of the plurality of location engines comprises using a first algorithm if the object is detected in an in-room area and has a threshold RSSI, and using a second algorithm if the object is not in an in-room area or a threshold RSSI is not detected.

4. The method according to claim 1 wherein each of the plurality of location engines is located at a single server.

5. The method according to claim 1 further comprising associating the transmitting object with a second object.

6. The method according to claim 1 further comprising triggering an event.

7. The method according to claim 6 wherein the event is at least one of commencing a workflow event, changing the status of a workflow process, transmitting an alert, transmitting a report, changing the status of a computer, activating a camera, and changing the state of light.

8. A system for determining a real-time location of an object within a facility, the system comprising:
   a plurality of objects, each of the plurality of objects comprising a communication device which transmits a wireless signal;
   a plurality of sensors positioned within the facility, at least one of the plurality of sensors receiving the wireless signal, the plurality of sensors forming a mesh network;
   a plurality of location engines, each of the plurality of location engines in communication with the mesh network, each of the plurality of location engines configured to determine a real-time location of the object from the wireless signal utilizing a location algorithm, wherein the location algorithm for each of the plurality of location engines includes at least two of a proximity algorithm, a radial basis function algorithm, a maximum likelihood algorithm, a genetic algorithm, a minimum mean squared error algorithm, a radiofrequency fingerprinting algorithm, a multilateration algorithm, an angle of arrival algorithm, a spatial diversity algorithm, and a nearest neighbor algorithm,
   wherein the plurality of location sub-algorithms comprise at least one of a voting algorithm, an averaging algorithm and a confidence algorithm.

9. The system according to claim 8 wherein at least one of the plurality of objects is a medical device or a person.

10. A method for determining a real-time location of an object within a facility, the method comprising:
    receiving a wireless signal from a communication device of an object at least one of a plurality of sensors positioned within a facility, wherein the wireless signal is one of light, sound and magnetic energy;
    forwarding the wireless signal from the at least one of a plurality of sensors to a first location engine;
    forwarding the wireless signal from the at least one of a plurality of sensors to a second location engine;
    calculating a real-time location of the object from the wireless signal utilizing a first location algorithm at the first location engine;
    calculating a real-time location of the object from the wireless signal utilizing a second location algorithm at the second location engine; and
    determining a real-time location of the object using the calculation from the first location engine and the calculation from the second location engine,
    wherein the first location algorithm or the second location algorithm is at least one of a voting algorithm, an averaging algorithm and a confidence algorithm.

11. The method according to claim 10 wherein first location algorithm is one of a proximity algorithm, a radial basis function algorithm, a maximum likelihood algorithm, a genetic algorithm, a minimum mean squared error algorithm, a multilateration algorithm, a time difference of arrival algorithm, a signal strength algorithm, a time of arrival algorithm, an angle of arrival algorithm, a spatial diversity algorithm, and a nearest neighbor algorithm.

12. The method according to claim 10 wherein second location algorithm is one of a proximity algorithm, a radial basis function algorithm, a maximum likelihood algorithm, a genetic algorithm, a minimum mean squared error algorithm, a multilateration algorithm, a time difference of arrival algorithm, a signal strength algorithm, a time of arrival algorithm, an angle of arrival algorithm, a spatial diversity algorithm, and a nearest neighbor algorithm.

* * * * *